United States Patent [19]
Oh

[11] 3,975,286
[45] Aug. 17, 1976

[54] LOW VOLTAGE ACTUATED FIELD EFFECT LIQUID CRYSTALS COMPOSITIONS AND METHOD OF SYNTHESIS

[75] Inventor: Chan S. Oh, Diamond Bar, Calif.

[73] Assignee: Beckman Instruments, Inc., Fullerton, Calif.

[22] Filed: Sept. 3, 1974

[21] Appl. No.: 502,658

[52] U.S. Cl.............................. 252/299; 252/408; 350/150; 350/160 LC; 260/473 R
[51] Int. Cl.² .................. C09K 3/34; G02F 1/13
[58] Field of Search.................. 252/408 LC, 299; 350/160 LC, 150

[56] References Cited
UNITED STATES PATENTS

| | | | |
|---|---|---|---|
| 3,773,747 | 11/1973 | Steinstrasser................ | 252/408 LC |
| 3,781,088 | 12/1973 | Tsukamoto et al........... | 252/408 LC |
| 3,792,915 | 2/1974 | Oh et al....................... | 252/408 LC |
| 3,815,972 | 6/1974 | Hsieh........................... | 252/408 LC |
| 3,819,531 | 6/1974 | Saeva et al.................. | 252/408 LC |
| 3,836,478 | 9/1974 | Green et al................. | 252/408 LC |
| 3,876,286 | 4/1975 | Deutscher et al........... | 252/299 |
| 3,881,806 | 5/1975 | Suzuki......................... | 252/299 |
| 3,891,307 | 6/1975 | Tsukamoto et al.......... | 252/299 |
| 3,915,883 | 10/1975 | Van Meter et al........... | 252/299 |
| 3,919,105 | 11/1975 | Katagiri et al............... | 252/299 |

FOREIGN PATENTS OR APPLICATIONS

| | | | |
|---|---|---|---|
| 807,165 | 3/1974 | Belgium...................... | 252/299 |
| 814,291 | 8/1974 | Belgium...................... | 252/299 |
| 2,139,628 | 2/1973 | Germany..................... | 252/299 |
| 2,306,738 | 8/1973 | Germany..................... | 252/299 |
| 2,327,036 | 12/1973 | Germany..................... | 252/408 LC |
| 2,306,739 | 8/1973 | Germany..................... | 252/408 LC |
| 2,024,269 | 12/1971 | Germany..................... | 252/299 |
| 49-88791 | 8/1974 | Japan........................... | 252/299 |

OTHER PUBLICATIONS
Raynes, E. P., "Improved Contrast Uniformity in Twisted Nematic Liquid Crystal Electro-Optic Display Devices";

*Primary Examiner*—Benjamin R. Padgett
*Assistant Examiner*—T. S. Gron
*Attorney, Agent, or Firm*—R. J. Steinmeyer; F. L. Mehlhoff

[57] ABSTRACT

A nematic liquid crystal composition suitable for use in displays and in other liquid crystal applications comprising a mixture of negative dielectric anisotropy low temperature characteristic nematic non-Schiff base liquid crystals and strongly positive dielectric anisotropy nematic non-Schiff base liquid crystals doped with traces of cholesteric liquid crystal are disclosed. These compositions have low actuation voltages and very rapid response times.

8 Claims, No Drawings

LOW VOLTAGE ACTUATED FIELD EFFECT LIQUID CRYSTALS COMPOSITIONS AND METHOD OF SYNTHESIS

CROSS-REFERENCE TO RELATED APPLICATIONS

This application is related to Application Ser. No. 361,333, filed May 17, 1973 entitled LIQUID CRYSTAL COMPOSITION AND DEVICES, Chan S. Oh; application Ser. No. 446,807, filed Feb. 28, 1974, entitled FIELD EFFECT LIQUID CRYSTAL COMPOSITIONS, Chan S. Oh; application Ser. No. 446,806, filed Feb. 28, 1974, entitled NON-SCHIFF BASE FIELD EFFECT LIQUID CRYSTAL COMPOSITIONS, Chan S. Oh.

FIELD OF THE INVENTION

This invention relates to nematic liquid crystals of the type used for display and information handling and, particularly, relates to liquid crystal compositions suitable for use in twisted nematic display devices.

References 1 through 14, listed at the end of the specification and the aforementioned patent applications provide a background of the general subject matter of the present patent. The remaining references are of interest concerning recent developments in this field. The content and disclosure of these references are incorporated herein by reference and a knowledge of the disclosures of these references is assumed.

Nematic liquid crystal display devices conventionally consist of two transparent substrates spaced a very small distance, e.g. 12.5 micron, apart, the space being filled with nematic liquid crystals. Upon the application of a voltage between the two substrates, the light transmissive characteristics of the liquid crystals can be controlled to provide light transmission or to block off the transmission of light. Thus, these liquid crystal devices can serve effectively as very rapidly acting light gates. The prior art devices generally operate with a voltage of from about 6 volts to 10 volts or higher for cells in which the substrates are separated by 12.5 microns. In practice, separations less than about 12.5 microns are difficult to obtain on a repeatable basis and mass production of cells with smaller spacings is not practical.

The output of integrated timing, counting, and like circuits is inherently from about 2.5 to about 3.3 volts; however, in the prior art, it has been necessary to multiply this voltage two or more times in order to obtain sufficient voltage to actuate liquid crystal devices.

Another problem faced by the prior art is the high consumption of energy in integrated circuitry, voltage multipliers and liquid crystal devices. Energy consumption is particularly important in certain portable display devices such as liquid crystal display wrist watches. It is a practical necessity that batteries last for 6 to 12 months in wrist watches. This has not heretofore been a readily achievable goal, however, and the problem of power consumption continues to plague the industry.

One method by which power consumption can be reduced is to operate the liquid crystal display device at the inherent output voltage, 2.5 to 3.3 volts, of the integrated circuit. This inherently requires less power and, with the elimination of voltage multiplier circuitry, has offered a particularly advantageous route to the reduction of energy consumption.

Heretofore, however, this route of reduced energy consumption has not been successfully pursued because of the impossibility or the impracticability of operating liquid crystal display devices at less than about 5 or 6 volts.

One of the features of this invention, then, is to provide a liquid crystal display which is actuated at voltages readily obtainable from integrated circuitry, i.e., from about 2.5 to about 3.3 volts. This feature results from the mixing of particularly selected liquid crystal constituents to give a low actuation voltage characteristic liquid crystal. However, such liquid crystal compositions have always been characterized by slow response, either in rise or decay of the transmission curve upon the application or removal of the actuating voltage.

A particularly important feature of this invention is the provision of liquid crystal compositions which are doped with traces of from about 0.05 to about 5 mole percent of cholesteric liquid crystal with the result that the actuation time is very greatly reduced.

Another facet of the invention is the provision of a method of synthesizing certain highly attractive liquid crystal compositions.

We have reported previously on certain advantageous characteristics which can be obtained by selective mixing of positive dielectric anisotropy and negative dielectric anisotropy nematic non-Schiff base liquid crystals, see the aforesaid patent applications. One of the important facets of this invention is that certain of these mixed liquid crystal systems can be improved so as to be actuated at low voltges of from 2.5 to 3.3 volts in twisted nematic liquid crystal displays in which the substrates are spaced approximately 12.5 microns apart.

SUMMARY OF THE INVENTION

The inventive compositions consist essentially of a mixture of positive dielectric anisotropy nematic non-Schiff base liquid crystals and negative dielectric anisotropy nematic non-Schiff base liquid crystals, the latter to provide an adequate temperature for the nematic phase, and a cholesteric liquid crystal dopant to provide fast response times.

The positive dielectric anisotropy nematic non-Schiff base liquid crystals may include one or more of the following compounds:

Compounds selected from the group having the general formula:

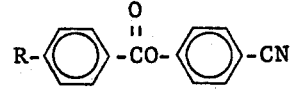

wherein R is a lower alkyl or alkoxy group having from 1 to 7 carbon atoms.

Compounds selected from the group having the general formula:

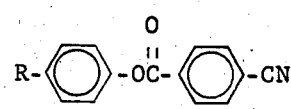

wherein R is a lower akyl or alkoxy group having from 1 to 7 carbon atoms.

The negative dielectric anisotropy nematic non-Schiff base liquid crystals may be selected from the following compounds:

Compounds having the general formula:

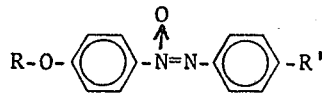

in eutectic mixture with corresponding compounds having the general formula:

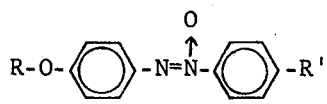

wherein, in each of said classes of compounds, R and R' are lower alkyl groups having from 1 to 4 carbon atoms, corresponding compounds being those compounds in which R is the same in both compounds and R' is the same in both compounds.

Combinations of eutectic mixtures as set forth in the preceding paragraph wherein R and R' in one such eutectic mixture is different from R and R' in another of such eutectic mixtures, the two eutectic mixtures being combined.

Compounds selected from the group having the general formula:

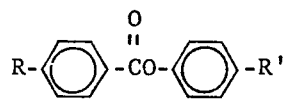

wherein R is lower alkyl having from 1 to 7 carbon atoms and R' is lower alkoxy having from 1 to 7 carbon atoms and wherein R is lower alkoxy having from 1 to 7 carbon atoms and R' is lower alkyl having from 1 to 7 carbon atoms.

Compounds selected from the group having the general formula:

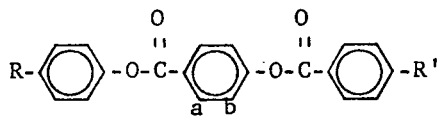

wherein R and R' are lower alkyl groups having from 1 to 7 carbon atoms and $a$ and $b$ may both be H— and wherein either $a$ or $b$, but not both, may be Cl—.

Binary, ternary, and more complex mixtures within these groups may form either the positive dielectric anisotropy liquid crystal or the negative dielectric anisotropy liquid crystal. These materials and combinations of materials and the characteristics of these compositions are disclosed and discussed in the co-pending applications.

In general, any ratio of positive dielectric anisotropy (PDA) and negative dielectric anisotropy (NDA) liquid crystals may be used, but PDA in the range of from about 30 percent to about 80 percent was most satisfactory. In general, also, the lower molecular weight esters gave better results, particularly as to the nematic phase temperature range and speed of response.

The threshold voltage for actuation in display cells of the type under consideration, e.g., a 12.5 micron thickness of liquid crystal between substrates, employing certain concentrations of a cholesteric liquid crystal, cholesteryl nonanoate, was observed. At 0.8 percent, the entire mixture became cholesteric and actuation voltages jumped very rapidly to about 15 volts or more in most instances, and the cells exhibited strong optical rotatory power. Thus, at concentrations of cholesteryl nonanoate above about 0.8 percent the nematic phase is lost and the material becomes useless for its intended purpose. The range of from about 0.1 to about 0.3 mole percent appears optimum with good results extending to 0.5 percent although no particular advantage was noted in using more than about 0.3 percent and above about 0.4 percent the saturation voltage increased to more than 2.5 volts and was considered less desirable for 3 volt actuated displays. The total rise time was increased as the concentration of cholesteryl nonanoate was increased. Again, from about 0.1 to about 0.3 mole percent was chosen as optimum.

Optimum and operational concentrations of cholesteric liquid crystal in the compositions of this invention depend upon the particular cholesteric material under consideration. The operational range is above 0.05 mole percent and extends to the point where the entire compositions begins to assume predominantly cholsteric liquid crystal characteristics. The upper limit is marked by a rapid rise in saturation voltage and can be determined readily by experimentation.

In the case of cholesteryl nonanoate, the maximum concentration range is about 0.8 mole percent. In the case of the optically active cholesteric liquid crystal ester described hereinafter, the maximum concentration range is about 5 mole percent, and the optimum range is from about 0.5 to about 5.0 mole percent. As used in this patent, the term "operational range" refers to the concentration of cholesteric liquid crystal which is effective to bring about a rapid decay time of not more than about 350 milliseconds at actuation voltages of 3Vrms for a 12.5 micron thick twisted nematic display unit. The operational range is inherently limited as to maximum concentration by the appearance of cholesteric liquid crystal predominance which is indicated, inter alia, by a rapid rise in saturation voltage.

Considerable variability will be experienced using different cholesteric materials; however, the operational range is easily determined by experimentation based upon the concepts and principles taught herein and that the concentration will most often be from about 0.05 to about 8 mole percent.

The most dramatic effect of the addition of cholesteric liquid crystal dopant was observed in respect to the decay time. Usually, the undoped samples had decay times from 400 ms to about 600 ms. This decay time was reduced to 200 to 350 ms by the addition of the cholesteric dopant. In this instance, also, the optimum range appeared to be from about 0.1 to about 5 mole percent.

With concentrations of the cholesteric dopant held constant at 0.25 percent, the amount of PDA was varied from 30 to 80 percent. Turn on Delay time decreased as PDA concentration increased, but relaxation time increased with concentration of PDA. Threshold and 90 percent saturation voltage decreased rapidly and leveled off at 30 to 40 mole percent PDA with no significant changes at higher concentrations. An optimum composition was tentatively determined to be about 40 percent PDA and about 0.3 percent cholesteryl nonanoate. This composition remained nematic for a long period of time at temperatures below 0° C. without signs of crystalization.

Both steroid and non-steroidal cholesteric liquid crystals are suitable as dopants. For example, both cholesteryl nonanoate and cholesteric liquid crystal compositions of the general formula:

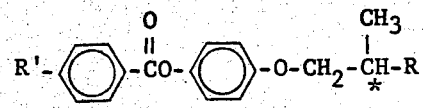

wherein R is lower alkyl from 2 to 4 carbon atoms and R' is lower alkyl from 1 to 7 carbon atoms, the center of asymmetry being shown by the asterisk, were found most satisfactory, the latter compound being preferred.

The invention includes a novel method for synthesizing the foregoing class of compounds, shown in the following flow schematic:

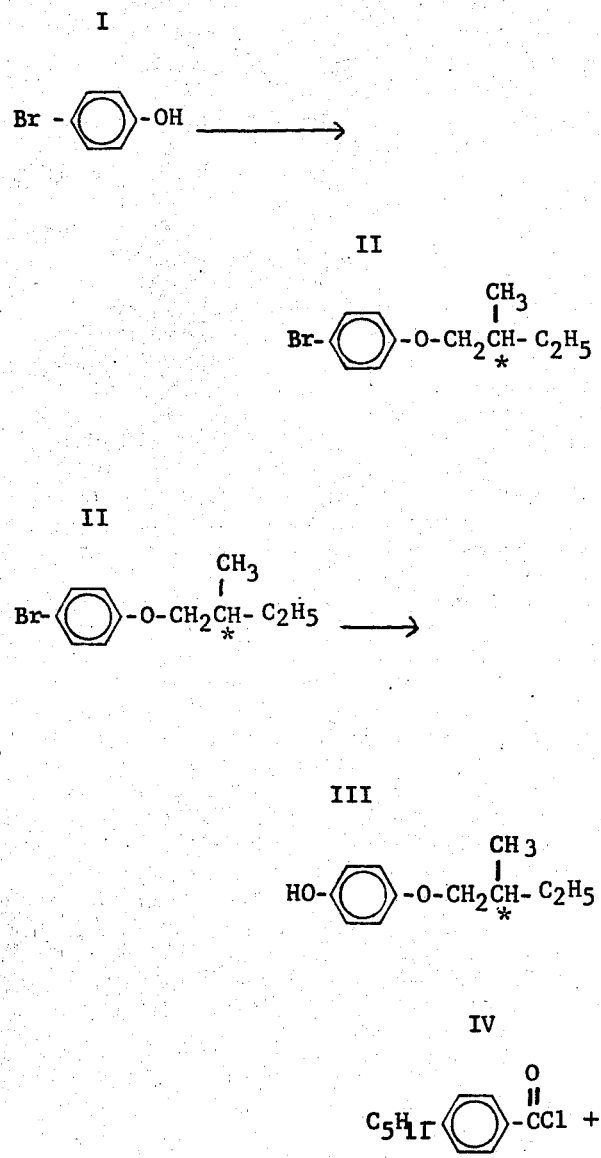

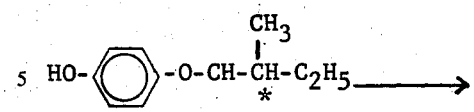

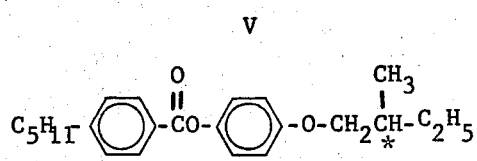

The preparation is described in detail as follows, the details of conditions, reagents, and substeps being provided for completeness of disclosure and not for the purpose of limiting the scope of the invention to these specific details. Considerable variation is permitted in certain steps, conditions, and reagents, including the substitution of known equivalents, all within the skill of the organic synthesist.

Step 1

Preparation of (S)-4-Bromo-(2'-methylbutoxy)-benzene(II) A mixture of 428g (2.83 moles) of (S)-1-bromo-2-methylbutane, 490g (2.83 moles) of p-bromophenol, and 120g (3.0 moles) of sodium hydroxide in 2000 ml of 95% alcohol was refluxed for 3 hr., cooled to room temperature and diluted with 2000 ml of water. The organic layer was separated, dissolved in ether, washed with 10% sodium hydroxide and saturated sodium chloride solutions, dried ($Na_2SO_4$), stripped, and distilled (85°C/0.10mm) to give 313g (46% yield) of a clear liquid.

Step 2

Preparation of (S)-4-(2'-methylbutoxy)-phenol (III) A grignard reagent prepared in the usual way from 313g (1.29 moles) of (S)-4-bromo-(2'-methylbutoxy)-benzene and 35g (1.45 moles) of magnesium and 1 liter of THF while maintaining a temperature below −10°C. using an alcohol-dry ice bath. Then 110 ml of acetic acid was added all at once, followed by the dropwise addition of a solution of 140 ml (1.4 moles) of 30% hydrogen peroxide in 150 ml of water while maintaining a temperature below 0°C. The reaction mixture was washed with a saturated ammonium sulfate solution containing a small amount of ferrous ammonium sulfate until the rust color disappeared from the washings. The organic layer was dried ($Na_2SO_4$), stripped, and distilled (115°C/0.10mm) to give 150g of a yellow oil which solidified upon standing. Recrystallization from hexane gave 108g white solid, mp 32°–35°C (47% yield).

Step 3

Preparation of (S)-4'-(2''-methylbutoxy)-phenyl-4-n-pentylbenzoate (V) To a mixture of 27 (0.15mole) of (S)-4-(2'-methylbutoxy)-phenol and 15 ml of triethylamine in 250 ml of methylene chloride was added dropwise 32g (0.15 mole) of p-pentylbenzoyl chloride at room temperature. Then the mixture is washed successively with water, 15% hydrochloric acid, a 10% sodium hydroxide solution, and a saturated sodium chloride solution and is dried (Na$_2$SO$_4$), stripped and distilled (195°–205°C/0.10mm) to give upon cooling a white solid which was recrystallized from isopropanol to give 21g white plates mp 33°C, monotropic liquid-nematic transition temperature 6°C.

EXAMPLES

Specific examples of compositions along with certain observed characteristics are given below.

Example I

A mixture consisting of:
48.000 part of 4'-cyanophenyl-4-n-heptylbenzoate,
11.610 part of 4'-n-butylphenyl-4-anisoate,
7.740 part of 4'-methoxyphenyl-4-n-butylbenzoate,
19.350 part of 4'-n-hexyloxyphenyl-4-n-butylbenzoate,
12.900 part of 4''-n-pentylphenyl-3-chloro-4-(4'-n-pentylbenzoyloxy)benzoate, and
0.400 part of cholesteryl nonanoate
exhibited the following electro-optic characteristics. (12.5 micron thick cells, 25°C).

| | |
|---|---|
| Threshold voltage | 1.25 volt |
| 90% T. Saturation voltage | 2.60 volt |
| Turn On Delay Time | 100 milliseconds (at 3 volts) |
| Rise Time | 100 Milliseconds (at 3 volts) |
| Decay Time | 220 milliseconds (at 3 volts) |

Example II

A mixture consisting of:
37.500 part of 4'-cyanophenyl-4-n-heptylbenzoate,
13.995 part of 4'-n-butylphenyl-4-anisoate,
9.330 part of 4'-methoxyphenyl-4-n-butylbenzoate,
23.325 part of 4'-n-hexyloxyphenyl-4-n-butylbenzoate,
15.550 part of 4''-n-pentylphenyl-3-chloro-4-(4'-n-pentylbenzoyloxy)benzoate, and
0.300 part of cholesteryl nonanoate
exhibited the following electro-optic characteristics. (12.5 micron thick cell, at 25°C).

| | |
|---|---|
| Threshold voltage | 1.1 volt |
| 90%T. Saturation voltage | 2.2 volt |
| Turn On Delay Time | 70 milliseconds (at 3 volt) |
| Rise time | 90 milliseconds (at 3 volt) |
| Decay time | 240 milliseconds (at 3 volt) |

Example III

A mixture consisting of:
30.000 part of 4'-cyanophenyl-4-n-heptylbenzoate,
15.660 part of 4'-n-butylphenyl-4-anisoate,
10.440 part of 4'-methoxyphenyl-4-n-butylbenzoate,
26.100 part of 4'-n-hexyloxyphenyl-4-n-butylbenzoate,
17.400 part of 4''-n-pentylphenyl-3-chloro-4-(4'-n-pentylbenzoyloxy)benzoate, and
0.400 part of cholesteryl nonanoate
exhibited the following electro-optic characteristics (12.5 micron thick cells, at 25°C).

| | |
|---|---|
| Threshold voltage | 0.9 volt |
| 90%T. Saturation voltage | 2.0 volt |
| Turn on Delay Time | 70 milliseconds (at 3 volts) |
| Rise Time | 110 milliseconds (at 3 volts) |
| Decay Time | 250 milliseconds (at 3 volts) |

Example IV

A mixture consisting of:
37.500 part of 4'-cyanophenyl-4-n-heptylbenzoate,
13.725 part of 4'-n-butylphenyl-4-anisoate,
9.150 part of 4'-methoxyphenyl-4-n-butylbenzoate,
22.875 part of 4'-n-hexyloxyphenyl-4-n-butylbenzoate,
15.250 part of 4''-n-pentylphenyl-3-chloro-4-(4'-n-pentylbenzoyloxy)benzoate, and
1.5 part of (S)-4'-(2''-methylbutoxy)phenyl-4-n-pentylbenzoate
exhibited the following electro-optic characteristics. (12.5 micron thick cell, at 25°C).

| | |
|---|---|
| Threshold voltage | 1.15 volt |
| 90%T. Saturation Voltage | 1.80 volt |
| Turn On Delay Time | 110 milliseconds (at 3 volts) |
| Rise Time | 100 milliseconds (at 3 volts) |
| Decay time | 350 milliseconds (at 3 volts) |

Summary of Inventive Concept

The concept of this invention is, fundamentally, that a low voltage (e.g. 2.5 to 3.3 Vrms in a 12.5 micron thick twisted nematic liquid crystal display device) actuatable liquid crystal composition having a short (e.g. less than about 300 milliseconds) decay time, along with rapid turn on time (e.g. on the order of 100 milliseconds delay and 100 milliseconds rise), is possible using a mixture which includes at least three classes of liquid crystal materials: (1) a positive dielectric anisotropy non-Schiff base liquid crystal; (2) a negative dielectric anisotropy non-Schiff base liquid crystal; and (3) a cholesteric liquid crystal; the latter being a minor constituent present in an operational range of concentration effective to bring about a short decay time with saturation voltages on the order of 3Vrms (12.5 micron cell) and a concentration less than that which causes the composition to become predominantly cholesteric in nature, with the accompanying rapid increase in saturation voltage. Within this concept, and founded upon the teachings and principles set forth in this patent, a large variety of materials and concentrations of materials can be used. For example, more than one positive dielectric anisotropy non-Schiff base liquid crystal compound and/or more than one negative dielectric anisotropy non-Schiff base liquid crystal compound and/or more than one cholesteric liquid crystal compound may be used. While the composition consists essentially of these three constituents, each or any of which may be a multiple component constituent, other materials may be present in such quantities as do not destroy the characteristic of the composition as set forth hereinbefore. Dyes, trace materials, and special effect materials, for example, may be present so long as these materials do not destroy the results accomplished through the teachings of this invention. Considerable variability in concentration of the cholesteric, as well as the other, liquid crystal compounds is possible, depending upon the precise nature of the compound; the operational range of the cholesteric liquid crystal being easily determined by routine experimentation based upon the teachings of this patent and in accordance with the principles of this invention.

Another concept of this invention is the synthesis of a particularly advantageous cholesteric ester type liquid crystal compound, (S)-4-(2″methylbutoxy)-phenyl-4-n-pentylbenzoate, starting from 4-bromophenol, obtaining highly pure monoether of hydroquinone and 4-alkoxyphenol in which the alkyl chain includes optically active hydrocarbon.

The method of synthesis extends, of course, to analogous compounds, such as compounds having the general formula

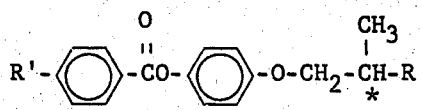

wherein R and R' are lower alkyl groups preferably having from 2 to 4 carbon atoms and comprising from 1 to 7 carbon atoms respectively.

Specific examples and precise information as to compositions, processes, steps, conditions of reaction, and other facets of the subject matter of the patent are given herein; however, these precise and detailed data do not constitute nor limit the inventive concept and are provided to aid those skilled in the art to practice the invention. The scope of the invention is defined and limited only by the claims.

References cited in the Specification

The following patents and publications are incorporated herein as background material and no representation is made respecting pertinence or completeness:
1. Brown, G. H., CHEMISTRY, 40, 10, 1967
2. Brown, G. H., ANAL. CHEM., 41, 26A 1969
3. Brown, G. H., Shaw, W. G., CHEM. REV., 57, 1049, 1957.
4. AMERICAN CHEMICAL SOCIETY. ORDERED FLUIDS & LIQUID CRYSTALS. (Advances in Chemistry. Ser., No. 63) 1967. 11.50 (ISBN 0-84-12-0064-5) Am. Chemical.
5. Brown, G., et al. LIQUID CRYSTALS PROCEEDINGS OF 1965 CONFERENCE, 1967 30.00 Gordon.
6. Gray, G. W., MOLECULAR STRUCTURE & THE PROPERTIES OF LIQUID CRYSTALS. 1962 11.00 (SBN 0-12-296556.6) Acad. Pr.
7. Schuele, Donald E., ed. A REVIEW OF THE STRUCTURE & PHYSICAL PROPERTIES OF LIQUID CRYSTALS. 11.50 Chem. Rubber.
8. U.S. Pat. No. 3,322,485, R. Williams — May 30, 1967.
9. U.S. Pat. No. 3,540,796, J. E. Goldmacher et al, Nov. 17, 1970.
10. U.S. Pat. No. 3,597,044, J. A. Castellano, Aug. 3, 1971.
11. U.S. Pat. No. 3,656,834, I. Haller, et al, Apr. 18, 1972.
12. U.S. Pat. No. 3,675,987, M. J. Rafuse, July 11, 1972.
13. U.S. Pat. No. 3,703,329, J. A. Castellano, Nov. 21, 1972.
14. U.S. Pat. No. 3,731,986, J. L. Fergason, May 8, 1973.
15. Sussman, A., IEEE TRANS. ON PARTS. HYBRIDS, AND PACKAGING, Vol. p11p-8, No. 4, Dec. 1972, pp. 24–37.
16. Gray, G. W., Harrison, K. J., Nash, J. A. and Raynes, E. P., Electron Lett., 1973, pp. 616–617.
17. Raynes, E. P., "Improved Contrast Uniformity in Twisted Nematic Liquid Crystal Electro-Optic Display Devices," (Copy transmitted herewith).
18. Gray, G. W., Harrison, K. J., and Nash, J. A., Electron. Lett., 1973, 9, pp. 130–131.
19. Gray. G. W., Harrison, K. J., Nash, J. A., Constant, J., Hulme, D. S., Kirton, J., & Raynes, E. P., "Stable, Low Melting Nematogens of Positive Dielectric Anisotropy for Display Devices", presented at the 166th National Meeting of the American Chemical Society, Chicago, 1974. (Copy submitted herewith).

What is claimed is:
1. A liquid crystal composition suitable for use in twisted nematic display systems consisting essentially of the following liquid crystal constituents:
   Constituent One — one or more low molecular weight negative dielectric anisotropy non-Schiff base liquid crystal compounds, comprising from about 20 to about 90 mole percent of the composition;
   Constituent Two — one or more positive dielectric anisotropy non-Schiff base liquid crystal compounds, comprising from about 10 to about 80 mole percent of the composition; and
   Constituent Three — one or more cholesteric liquid crystal compounds, comprising a minor constituent in the composition and being present in an operational range of concentration effective to bring about a short decay time not more than about 350 milliseconds with saturation voltages of less than about 3.3 Vrms in a 12.5 micron thick cell, said concentration being less than that which results in the predominance of cholesteric properties in the composition, said composition being nematic in its electro-optical properties.

2. The liquid crystal composition defined in claim 1 wherein the concentration of constituent three is at least about 0.05 and not greater than about 5.0 mole percent.

3. The liquid crystal composition defined in claim 1 wherein constituent three consists essentially of an ester of cholesterol and the concentration is between about 0.05 and 0.8 mole percent.

4. The liquid crystal composition defined in claim 3 wherein constituent three consists essentially of cholesteryl nonanoate.

5. The liquid crystal composition defined in claim 2 wherein the concentration of constituent three is at least about 0.5.

6. The liquid crystal composition defined in claim 5 wherein constituent three consists essentially of one or more compounds selected from the group having the general formula:

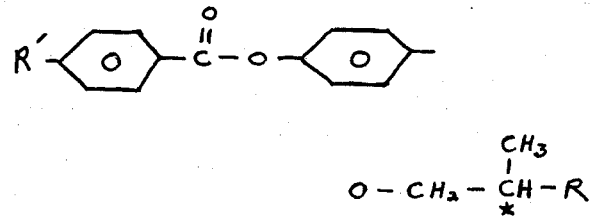

wherein R is a lower alkyl radical having from 2 to 4 carbon atoms and R' is a lower alkyl radical having from 1 to 7 carbon atoms, the center of asymmetry being shown by the asterisk.

7. The liquid crystal composition defined in claim 6 wherein constituent three consists essentially of (S)-4-(2''-methylbutoxy)-phenyl-4-n-pentylbenzoate.

8. The liquid crystal composition defined in claim 1 wherein the positive dielectric anisotropy non-Schiff base liquid crystals include one or more of the following compounds:

A. compounds selected from the group having the general formula:

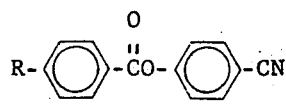

wherein R is a lower alkyl or alkoxy group having from 1 to 7 carbon atoms;

B. compounds selected from the group having the general formula:

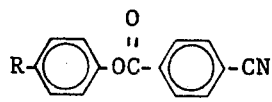

wherein R is a lower alkyl or alkoxy group having from 1 to 7 carbon atoms; and the negative dielectric anisotropy non-Schiff base liquid crystals include one or more of the following compounds:

a. compounds selected from the group having the general formula:

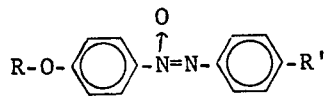

in eutectic mixture with corresponding compounds having the general formula:

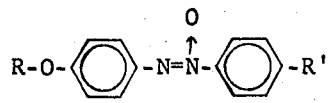

wherein, in each of said classes of compounds, R and R' are lower alkyl groups having from 1 to 4 carbon atoms, corresponding compounds being those compounds in which R is the same in both compounds and R' is the same in both compounds;

b. combinations of eutectic mixtures as set forth in preceding paragraph (a) wherein R and R' in one such eutectic mixture is different from R and R' in another of such eutectic mixture, the two eutectic mixtures being combined;

c. compounds selected from the group having the general formula:

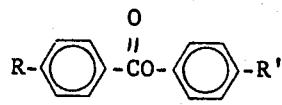

wherein R is lower alkyl having from 1 to 7 carbon atoms and R' is lower alkoxy having from 1 to 7 carbon atoms and wherein R is lower alkoxy having from 1 to 7 carbon atoms and R' is lower alkyl having from 1 to 7 carbon atoms; and d. compounds selected from the group having the general formula:

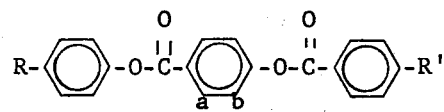

wherein R and R' are lower alkyl groups having from 1 to 7 carbon atoms and $a$ and $b$ may both be H— and wherein either $a$ or $b$, but not both, may be Cl—.

* * * * *